T. M. EYNON.
FLAT TIRE INDICATOR.
APPLICATION FILED DEC. 18, 1919.

1,415,820. Patented May 9, 1922.
2 SHEETS—SHEET 1.

INVENTOR.
Thomas M. Eynon
BY
ATTORNEY.

T. M. EYNON.
FLAT TIRE INDICATOR.
APPLICATION FILED DEC. 18, 1918.
1,415,820.
Patented May 9, 1922.
2 SHEETS—SHEET 2.
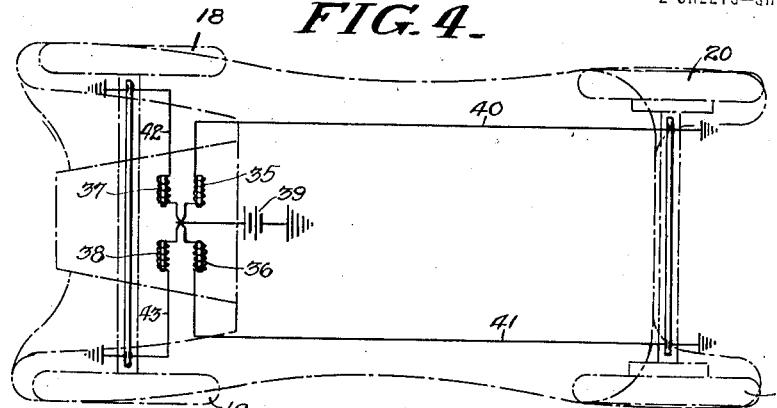
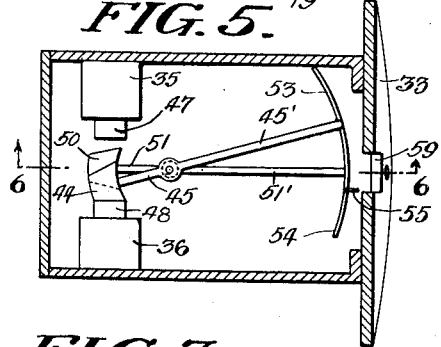
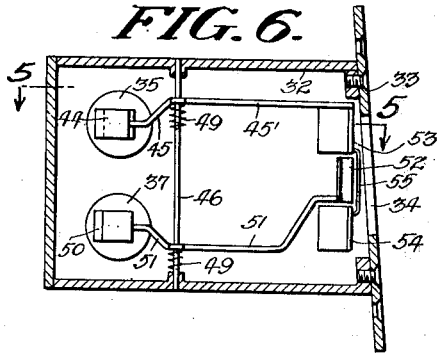
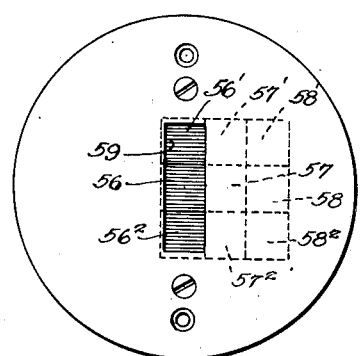
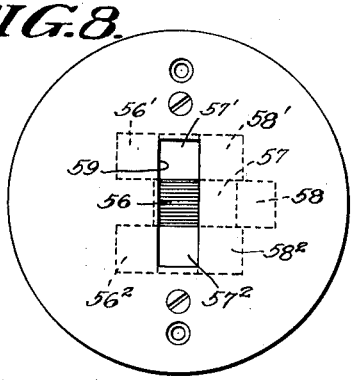
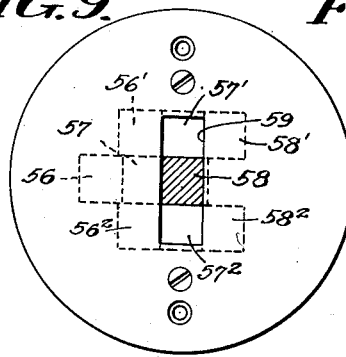
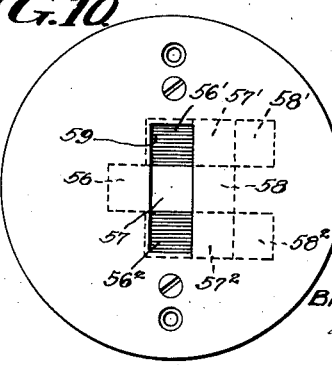
INVENTOR
Thomas M. Eynon
BY *Wm Steell Jackson*
ATTORNEY.

UNITED STATES PATENT OFFICE.

THOMAS M. EYNON, OF PHILADELPHIA, PENNSYLVANIA, ASSIGNOR TO MARGARET Y. EYNON, OF PHILADELPHIA, PENNSYLVANIA.

FLAT-TIRE INDICATOR.

1,415,820.  Specification of Letters Patent.  Patented May 9, 1922.

Application filed December 18, 1918. Serial No. 267,396.

*To all whom it may concern:*

Be it known that I, THOMAS M. EYNON, a citizen of the United States, residing at Royal Apartment, 1208 N. Broad St., Philadelphia, in the county of Philadelphia and State of Pennsylvania, have invented a certain new and useful Flat-Tire Indicator, of which the following is a specification.

My invention relates to automobiles and is intended to show the driver when a tire is flat.

The purpose of my invention is to use the canting of an end of an automobile due to the flattening of a tire as a basis for indication of the flattening of the tire, distinguishing from such canting as is due to lateral sloping of the road upon which the automobile is traveling.

A further purpose is to operate electric contact devices or other signals coincidently with the canting of the front and rear car axles, respectively, and compare the indications so that the throwing of one indicator in the absence of the throwing of the other will indicate the flattening of a tire.

I have preferred to illustrate my invention by but one form thereof, selecting a form which is simple, practical, efficient and inexpensive, and which at the same time well illustrates the principles of my invention.

Figure 4 is a top plan view, chiefly diagrammatic, illustrating the application of my invention.

Figure 5 is a section of a form of indicator used by me, taken upon line 5—5 of Figure 6.

Figure 6 is a central vertical section of the structure seen in Figure 5, some of the parts being in different position.

Figures 7, 8, 9 and 10 are front elevations of the indicator showing the parts in different positions.

Figure 1:
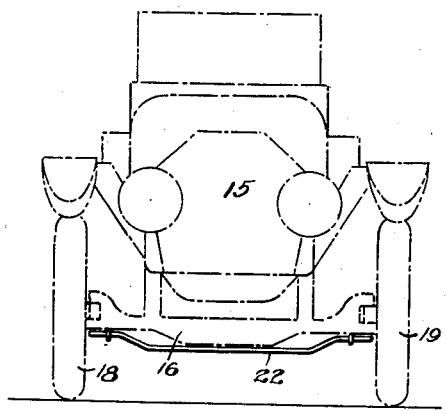
Figure 1 is an outline front elevation of an automobile showing part of the mechanism used in position and the tires full blown.
Figure 2:
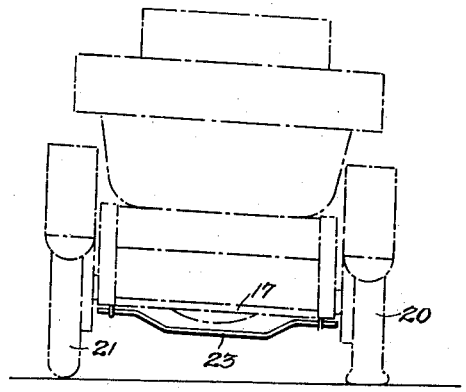
Figure 2 is a similar rear view of the automobile, but with one tire flattened.
Figure 3:
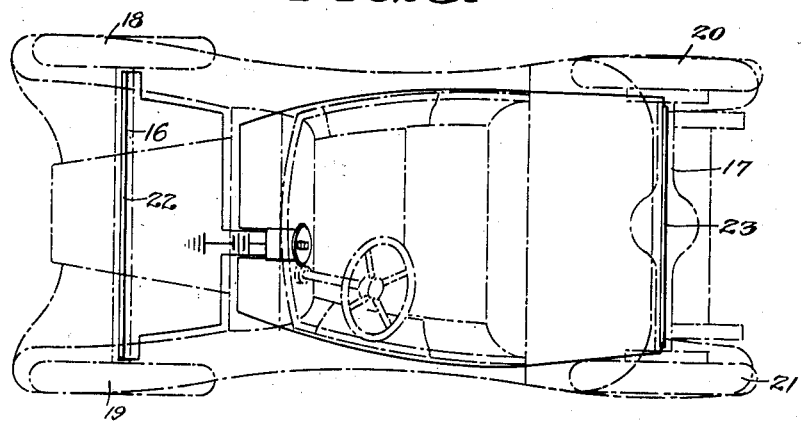
Figure 3 is an outline top plan view of an automobile, showing some of the parts of my invention in position.
Figure 11:
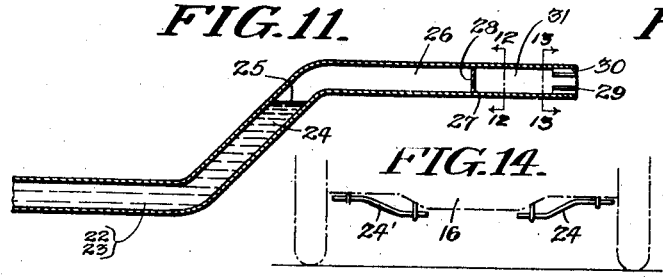
Figure 11 is a fragmentary longitudinal section through a part of the operating mechanism used by me.
Figures 12, 13:
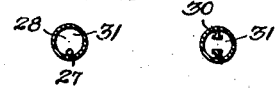

Figures 12 and 13 are sections upon lines 12—12 and 13—13 respectively, in Figure 11.

Figure 14:
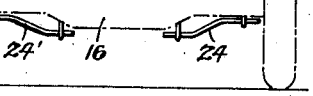

Figure 14 is a section similar to Figure 11 of a slightly modified form.

In the drawings, similar numerals indicate like parts.

Where an automobile tire has leaked air or has gone flat, under any circumstances than by bursting (which attracts attention by the noise) the driver frequently does not detect the fact quickly enough to avoid serious injury to the tire.

My invention aims to detect the fact by the immediate canting of the axle which carries the flattened tire, without corresponding canting of the other axle.

The automobile 15 is shown as having front and rear axles 16 and 17 respectively and with wheels 18, 19, 20 and 21, as shown.

At each end of the machine, I place a device which is operated by the canting of the corresponding axle, as indicative of the flattening of one of the tires, and provide for distinguishing between canting due to this cause and canting of the entire car on sloping road. This slope-operated device may be greatly varied and may operate upon differing principles, and with widely different constructions.

I well recognize, therefore, that the form shown is one only of various ways by which this can be obtained; also, that the indicator shown, though well suited to the use, is but one of many compact and convenient indicators available. With this understanding, I will proceed to describe in detail the construction by which I operate the indicator, as well as the type of indicator used, without intending to restrict to the particular types of mechanism shown.

The operating device shown includes tubes or containers 22, 23, each serving for two wheels, containing a non-freezing liquid, preferably mercury, shown at 24, which rests in the central part of the tube when the tube is horizontal and rises normally to some such level as 25. There is an advantage in having the body of liquid continuous, from one side to the other, so as to have available an additional quantity of liquid for the purpose required, but much the same result would be obtained by using separate containers such as 24, 24', one for each wheel as in Figure 14.

Upon level road and when the tires are fully blown, the liquid will remain at the normal level, but on laterally sloping road, or when a tire is flat, the liquid will flow into the space 26 upon one side or other of the tube.

If this flow be only temporary or momentary, it will remain in this space without an appreciable quantity passing through the opening 27 in the barrier or closure 28. However, when there is any considerable time during which the liquid occupies the space 26, a sufficient quantity will flow through the opening 27 to electrically unite the contacts 29 and 30 in space 31. As soon as the machine reaches level ground or ground sloping laterally in the opposite direction, the liquid will flow out of the space 31 and will cease to electrically unite the contacts 29 and 30, flowing back to the lower part of the container.

If electrical indication be chosen, therefore, any electrical indicator can be thrown or operated to show that the liquid occupies one of the spaces 31 and that the corresponding wheel is lower than its shaft mate.

If this be true as to both wheels on the same side of the car it will show that the machine is traveling on laterally sloping ground. However the canting of one of the operating mechanisms while the other is in horizontal or normal position ordinarily means a flat tire. Any type of indicator will therefore serve the purpose which will compare the positions of the two axles so that a contrast can readily be noted.

In Figures 5-10, I show a convenient form of indicator for this purpose, comprising a dash board box 32 having a front 33 with an opening 34 through which the indicator may be watched. Within this box I place four electromagnets 35, 36, 37 and 38, the electric circuits for which are operated by a common battery 39 and are grounded on the other side of the battery. The four controlling circuits supplied by the battery are shown at 40, 41, 42, 43 each connecting with one terminal 29 or 30, the other of which is grounded. These electrical connections will be appreciation from Figure 4.

The electromagnets 35 and 36 are operated from the contact makers (Figures 11-14) at the right and left sides respectively adjacent the rear wheels; and the electromagnets 37 and 38 are operated from the contact makers at the right and left sides respectively, adjacent the front wheels.

The electromagnets 35 and 36 operate upon the same armature 44, upon the end of an arm 45, pivoted at 46 and spring-centered to lie midway between the poles 47 and 48 by a spring 49, when the electromagnets are not energized.

Likewise, the electromagnets 37 and 38 operate upon a common armature 50, which is likewise spring-centered to lie between the electromagnets when they are not energized, and which is correspondingly mounted upon the end of an arm 51, which is centered to swing about the same axis 46.

The arms 45 and 51 are continued at 45' and 51', beyond the axis 46 to carry curved indicator plates, one or more for each arm It is of advantage to use two plates on one arm, lying on opposite sides of the (intermediate) plate carried by the other arm, to give a greater contact when the indications are different. I show such a construction in the figures, where the middle plate 52 is carried by the extension 51' of arm 51 and plates 53 and 54 are carried by the extension 45' of arm 45. The plate 53 is carried directly by the extension and supports plate 54 by a connection 55.

Each of the three plates is provided with the same succession of differently colored spaces, giving three different possible colors or appearances, indicated at 56, 57, 58; 56', 57', 58'; and $56^2$, $57^2$, $58^2$. The color spaces presented through opening 59 by plates 52 and 54 are always alike, though they may be any one of the space pairs 56' and $56^2$, 57' and $57^2$ or 58' and $58^2$.

It will be obvious that when none of the electromagnets is energized, the spaces 57, 57' and $57^2$ will show through the opening 59, giving the same character of appearance for all of these spaces.

On the other hand, if the wheels 19 and 21 be both low by reason of the ground over which they are passing being lower than the ground over which the wheels 18 and 20 are passing, both armatures will be attracted to the position in which the armature 44 is shown in Figure 5 and the showing through the opening 59 will correspond with the showing in Figure 7 where the colors corresponding to spaces 56, 56', $56^2$ will show. The colors will again all correspond.

If the wheels 18 and 20 be low, the armatures will both be drawn over to the opposite side from that at which 44 is shown in Figure 5, with the result that the like-colored faces 58, 58', $58^2$ will show and there will again be correspondence in the colors shown through the opening. On the other hand if the tire 19 be flat, soon after level ground is reached the showing will correspond to that in Figure 8 in which the electromagnet 38 is energized drawing the armature 50 over to one side, while none of the other electromagnets is energized. The armature 44 remains in neutral position and the opening in the indicator shows the spaces 57', 56 and $57^2$, a contrast which will attract immediate attention as indicating a flat tire.

In Figure 9 the corresponding position of the parts has been shown for a flat tire at 18 in which again the upper and lower plates are in neutral or central position, whereas the middle plate is thrown to the opposite side from that in Figure 8 by energization of the electromagnet 37.

In Figure 10 I have shown the indication corresponding to Figure 5 for a rear wheel left hand tire 21 flatted, in which the middle plate is in neutral position and in which the upper and lower plates have been thrown to one side by energization of magnet 36, showing a contrast between the colors upon the indicator.

In Figure 14 the same general construction is shown, as in Figure 11, except for separate compartments of conducting liquid adjacent the wheels. The compartments may be entirely disconnected.

Where a grounded electrical system is used, as in the illustration, it will be obvious that the wall of the container may be effective as one of the "contacts" which in this case is permanently connected with the liquid; and that the connection will then be made with the insulated contact whenever the liquid engages the insulated contact.

Having thus described my invention, what I claim as new and desire to secure by Letters Patent is:

1. In an automobile flat tire indicator, front and rear means at each side of the automobile for closing electrical contacts with depression of that side of the automobile, a plurality of indicators having contrasting indicia to signify depression of opposite sides of the automobile at the front or back, and independent connections including a battery and a plurality of electromagnets for throwing the indicators to show similar indications when the entire side is depressed and contrasting indications when one end only is depressed on one side thereof.

2. In an automobile flat tire indicator, front and rear means at each side of the automobile for closing electrical contacts individual to those positions with depression of that portion of the automobile, a pair of electromagnets controlled respectively by closing the contacts at one side and at the other at the front, an indicator common to the two electromagnets and positioned by movement due to energization of said electromagnets, a second pair of electromagnets and indicator common thereto, indicating the closing of the contacts at the rear at one side or the other, and battery provision for passing current through the contacts closed and the corresponding electromagnet.

3. In an automobile flat tire indicator, front and rear gravity actuated contact closing means at each side of the automobile for closing the contacts with depression of that side of the automobile at front or rear, separate pairs of electromagnets for the front and rear, each electromagnet being controlled by one contact closing means, and a pair of indicators, one common to each of said pairs of electromagnets, to indicate agreement or contrast in the depression of the same or opposite sides of the automobile at front or rear.

4. In a flat tire indicator, two pairs of electromagnets, connections from the electromagnets of one pair to locations on opposite side of the machine near the front of the machine and from the electromagnets of the other pair to locations on opposite sides of the machine near the rear of the machine, and electric contacts and fluid-operating mechanism therefor at these several points to close the electromagnet circuits as these points are low with respect to other points in the automobile, in combination with means for indicating a difference in the comparative levels at the front and rear.

5. In a flat tire indicator, two pairs of electromagnets, connections from the electromagnets of one pair to locations on opposite side of the machine near the front of the machine and from the electromagnets of the other pair to locations on opposite sides of the machine near the rear of the machine, and electric contacts and fluid-operating mechanism therefor at these several points to close the electromagnet circuits as these points are low with respect to other points in the automobile, in combination with indicators normally lying between the electromagnets and controlled by them to show magnetization of the electromagnets.

6. In an automobile flat tire indicator, a pair of indicator arms, adjacent indications thereon agreeing when in the same relative positions and contrasting when in different positions and combined gravity and electrically-operated means associated with the tires for controlling the arms to produce a contrasting indication upon the deflation of a tire.

THOMAS M. EYNON.